US011453324B2

(12) United States Patent
Lock et al.

(10) Patent No.: US 11,453,324 B2
(45) Date of Patent: Sep. 27, 2022

(54) AUTOMATIC FOUR BAR LINKAGE TAILGATE ANCHOR POINT

(71) Applicant: Philippi-Hagenbuch, Inc., Peoria, IL (US)

(72) Inventors: Nolan Lock, Bartonville, IL (US);
Mark Beyer, Mapleton, IL (US);
LeRoy George Hagenbuch, Peoria Heights, IL (US)

(73) Assignee: PHILIPPI-HAGENBUCH, INC., Peoria, IL (US)

(*) Notice: Subject to any disclaimer, the term of this patent is extended or adjusted under 35 U.S.C. 154(b) by 98 days.

(21) Appl. No.: 17/126,576

(22) Filed: Dec. 18, 2020

(65) Prior Publication Data

US 2021/0188146 A1 Jun. 24, 2021

Related U.S. Application Data

(60) Provisional application No. 62/951,338, filed on Dec. 20, 2019.

(51) Int. Cl.
*B60P 1/28* (2006.01)
*B60P 1/26* (2006.01)

(52) U.S. Cl.
CPC ............... *B60P 1/283* (2013.01); *B60P 1/26* (2013.01)

(58) Field of Classification Search
CPC .................................. B60P 1/26; B60P 1/283
USPC ....... 298/19 V, 11, 1 B, 1 R, 18, 2, 17 R, 17, 298/17.8, 17.5; 414/482, 495
See application file for complete search history.

(56) References Cited

U.S. PATENT DOCUMENTS

| | | | | |
|---|---|---|---|---|
| 2,720,418 A * | 10/1955 | Le Tourneau | ............ | B60P 1/14 298/19 V |
| 3,923,337 A * | 12/1975 | Kershaw | ................. | B60P 1/286 296/193.04 |
| 3,938,238 A * | 2/1976 | Kershaw | ................. | B60P 1/286 29/469 |
| 5,447,204 A * | 9/1995 | Asai | ...................... | E02F 3/7613 172/821 |
| 8,690,193 B2 * | 4/2014 | Yamamoto | .............. | B60P 1/283 280/856 |
| 8,721,006 B2 * | 5/2014 | Uranaka | ................... | B60P 1/28 298/17 R |
| 9,751,445 B1 * | 9/2017 | Arul | ....................... | B62D 21/09 |
| 10,399,432 B2 * | 9/2019 | Kesani | ................. | F01N 13/082 |
| 10,906,449 B2 * | 2/2021 | Petrie | ....................... | B60P 1/28 |

* cited by examiner

*Primary Examiner* — D Glenn Dayoan
*Assistant Examiner* — Sunsurraye Westbrook
(74) *Attorney, Agent, or Firm* — McDonnell Boehnen Hulbert & Berghoff LLP

(57) ABSTRACT

A mechanically fastened outrigger arrangement provides an anchor point for an automatic four bar linkage tailgate. The mechanically fastened outrigger arrangement includes an outrigger arrangement support frame and an outrigger extending outward from the outrigger arrangement support frame to a distal end configured to support a tailgate actuation link. Outrigger braces also extend from the outrigger arrangement support frame to the distal end of the outrigger. A lower clamp is configured to secure the outrigger arrangement support frame to a lateral support of a truck, and a truck frame clamp is configured to secure the outrigger arrangement support frame to a truck frame.

20 Claims, 21 Drawing Sheets

AUTOMATIC FOUR BAR LINKAGE TAILGATE ANCHOR POINT

CROSS REFERENCE TO RELATED APPLICATIONS

This application claims priority to U.S. Provisional Application No. 62/951,338, filed Dec. 20, 2019, which is hereby incorporated by reference herein in its entirety.

FIELD

The present disclosure generally relates to a support structure for a truck and, more particularly, relates to an anchor point for a truck automatic four bar linkage tailgate.

BACKGROUND

Large off-highway trucks such as trucks used in Quarries, Steel Mills, Mines, Landfills, Power Plants and Construction Projects are often outfitted with automatic four bar linkage tailgates. When fitted on such off-highway trucks three of the four bar linkage pivot points are readily available on such trucks. However, the fourth pivot point or "anchor point", of an Automatic Four Bar Linkage Tailgate, must be established or created and is typically cantilevered off the side of the truck frame. This cantilevered anchor point may be permanently affixed to the truck frame as a welded-on structure. However, on some off-highway truck frames there is a stipulation preventing welding to the off-highway truck frame so the normally welded on cantilevered anchor point attachment cannot be welded to the off-highway truck frame.

Most automatic off-highway truck tailgates utilize an automatic four bar mechanical linkage principle in their design and operation. The four bar linkage pivot points are; 1) the truck body pivot, 2) the tailgate rotation pivot point on the side of the truck body, 3) the forward nose pivot point of the tailgate arm and 4) the truck frame anchor point pivot cantilevered outward from the off-highway truck frame and with this anchor point then being in and operating in the same plane as the four bar linkage tailgate pivot points numbers 2 and 3.

For most off-highway trucks with automatic four bar linkage tailgates, the truck frame anchor point pivot is cantilevered outward from the truck frame and this cantilever structure with anchor point truck frame connections is welded directly to the truck frame. However, as higher strength steels become more common in some off-highway truck frames, welding to these high strength steel truck frames can be problematic. In particular, if the steel plate used in that off-highway truck frame is a heat-treated steel, welding to the heat-treated steel can be especially difficult. Heat-treated steel gets its ultimate strength thru a hot steel quenching and tempering process. And, unfortunately, if some heat-treated steel used in the off-highway truck frame is improperly welded, this welding process can lessen the ultimate strength of that off-highway truck frame. Additionally on all off-highway truck frames where welding on the truck frame is allowed, care must be exercised in the design of the weld joint connection points that attach items like a cantilevered anchor point to an off-highway truck frame to preclude causing high off-highway truck frame stress risers at the weld connection point to the off-highway truck frame.

For these reasons then, some off-highway truck manufacturers have established a "no weld" edict prohibiting welding to the off-highway truck frame.

To overcome this "no weld" edict and provide off-highway truck users with the substantial benefits of automatic four bar linkage tailgates, the present inventors have recognized that another method of attaching an automatic four bar linkage tailgate truck frame cantilevered anchor point is needed.

One way of addressing the "no weld" edict is to route the tailgate actuation link through conventional automatic tailgate roller boxes around the off-highway truck body side to the off-highway truck frame where it could be clamped to the off-highway truck frame. But this rigging of the automatic tailgate actuation link through these automatic tailgate roller boxes in some cases caused excessive wear to the automatic tailgate actuation link as it wound its way through the automatic tailgate roller boxes.

SUMMARY

Thus, the present disclosure provides a method of cantilevering the automatic four bar linkage tailgate anchor point from the truck frame with a bolt on clamping arrangement.

In a first aspect, the disclosure provides a mechanically fastened outrigger arrangement for providing an automatic four bar linkage tailgate anchor point, the mechanically fastened outrigger arrangement comprising:
 an outrigger arrangement support frame;
 an outrigger extending outward from the outrigger arrangement support frame to a distal end configured to support a tailgate actuation link;
 outrigger braces extending from the outrigger arrangement support frame to the distal end of the outrigger;
 a lower clamp configured to secure the outrigger arrangement support frame to a lateral support of a truck; and
 a truck frame clamp configured to secure the outrigger arrangement support frame to a truck frame.

In another aspect, the disclosure provides truck structure for use with an automatic four bar linkage tailgate, the truck structure comprising:
 a truck frame;
 a lateral support extending across the truck frame;
 a first outrigger arrangement disposed on a first side of the truck frame, the first outrigger arrangement comprising:
  a first outrigger arrangement support frame,
  a first outrigger extending outward from the first outrigger arrangement support frame to a distal end configured to support a first tailgate actuation link of the automatic four bar linkage tailgate,
  a first group of outrigger braces extending from the first outrigger arrangement support frame to the distal end of the first outrigger;
  a first lower clamp configured to secure the first outrigger arrangement support frame to the lateral support; and
  a first truck frame clamp configured to secure the first outrigger arrangement support frame to the truck frame; and
 a second outrigger arrangement disposed on a second side of the truck frame, the second outrigger arrangement comprising:
  a second outrigger arrangement support frame,
  a second outrigger extending outward from the second outrigger arrangement support frame to a distal end configured to support a second tailgate actuation link of the automatic four bar linkage tailgate,
  a second group of outrigger braces extending from the second outrigger arrangement support frame to the distal end of the second outrigger;

a second lower clamp configured to secure the second outrigger arrangement support frame to the lateral support; and a second truck frame clamp configured to secure the second outrigger arrangement support frame to the truck frame.

In another aspect, the disclosure provides a mechanically fastened outrigger arrangement for providing an automatic four bar linkage tailgate anchor point, the mechanically fastened outrigger arrangement comprising:

outrigger arrangement support plates;

an outrigger extending from the outrigger arrangement support plates;

outrigger braces extending from the outrigger arrangement support plates to a distal end of the outrigger;

an outrigger hoist clamp plate; and an outrigger truck frame clamp plate configured to secure a truck frame element between the outrigger truck frame clamp plate and the outrigger arrangement support plates.

These and other aspects of the disclosure will be evident to those of ordinary skill in the art from the following detailed description.

BRIEF DESCRIPTION OF THE DRAWINGS

The present disclosure is described in greater detail below based on the exemplary figures. The figures are not necessarily to scale and certain features and certain views of the figures may be exaggerated in scale or depicted in schematic form for clarity or conciseness. The disclosure is not limited to the exemplary embodiments. All features described and/or illustrated herein can be used alone or combined in different combinations in embodiments of the disclosure. Features and advantages of various embodiments of the disclosure will become apparent by reading the following detailed description with reference to the figures which illustrate the following.

DETAILED DESCRIPTION

As set forth above, the present inventors have identified that there is a need for an outrigger arrangement that is secured to the truck frame without welding and thereby conforms to the "no-weld" edict of some off-highway truck manufacturers. Accordingly, aspects of the disclosure relate to an outrigger arrangement and truck structure that provides a tailgate anchor point without welding to the truck frame.

Figure 1:
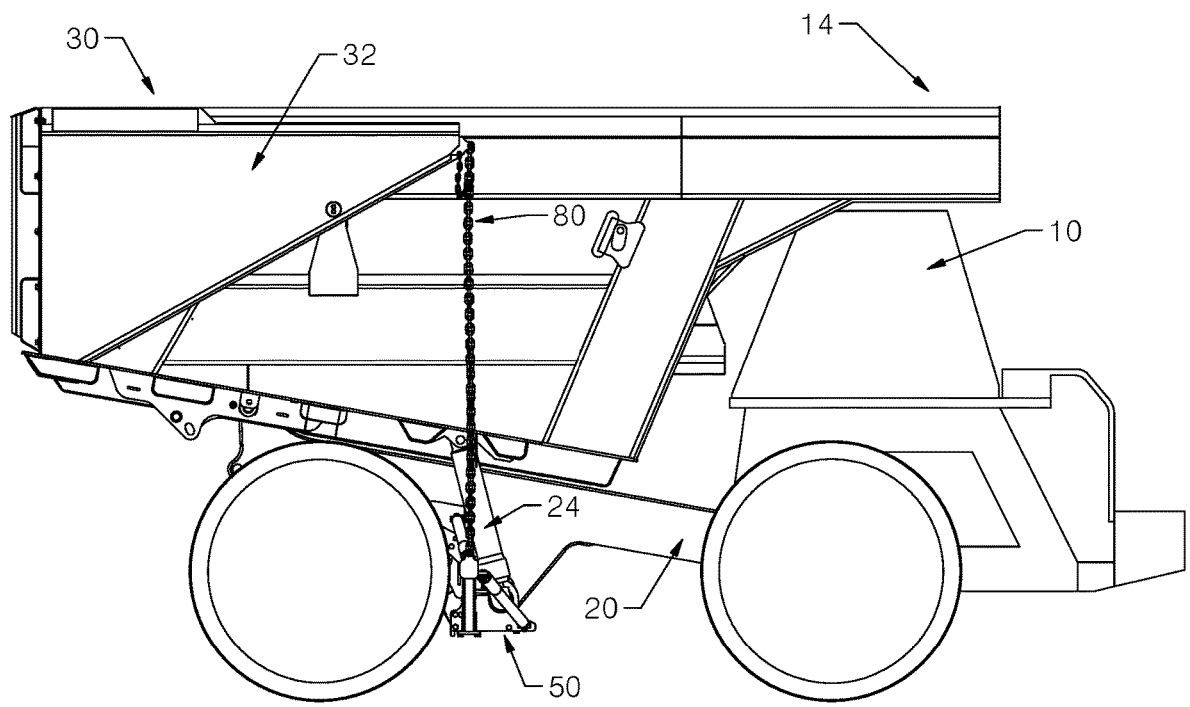
FIG. 1 is a schematic side view of an off-highway truck according to an embodiment of the disclosure in a first position.
Figure 2:
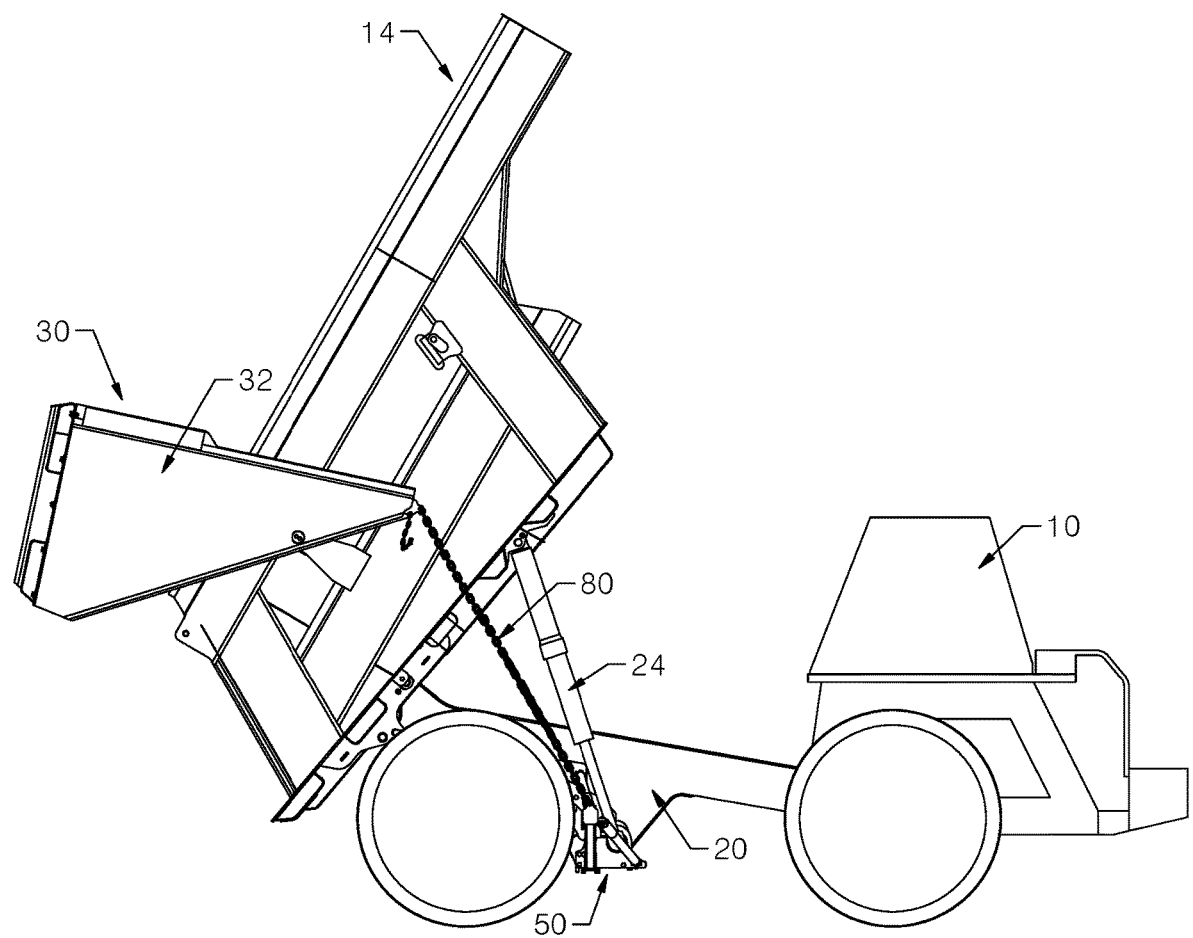
FIG. 2 is a schematic side view of the off-highway truck of FIG. 1 with the truck body in a raised position.

FIGS. 1 and 2 show an off-highway truck 10 that includes an outrigger arrangement 50 according to an embodiment of the disclosure. The off-highway truck 10 includes a truck body 14 that is supported by a truck frame 20. When the off-highway truck 10 is in a material haulage position, as shown in FIG. 1, the truck body 14 rests on the truck frame 20 in a lowered configuration. When it is desired to remove the material from the truck body, a hoist 24 is extended to move the truck body 14 to a dumped position, as shown in FIG. 2. For example, the hoist 24 may be one or more hydraulic cylinders that move from a compressed position, in which the truck body 14 is in the material haulage position, to an extended position, in which the front end of the truck body 14 is lifted to a dumped position so that hauled material is dumped from the truck body 14.

Figure 3:
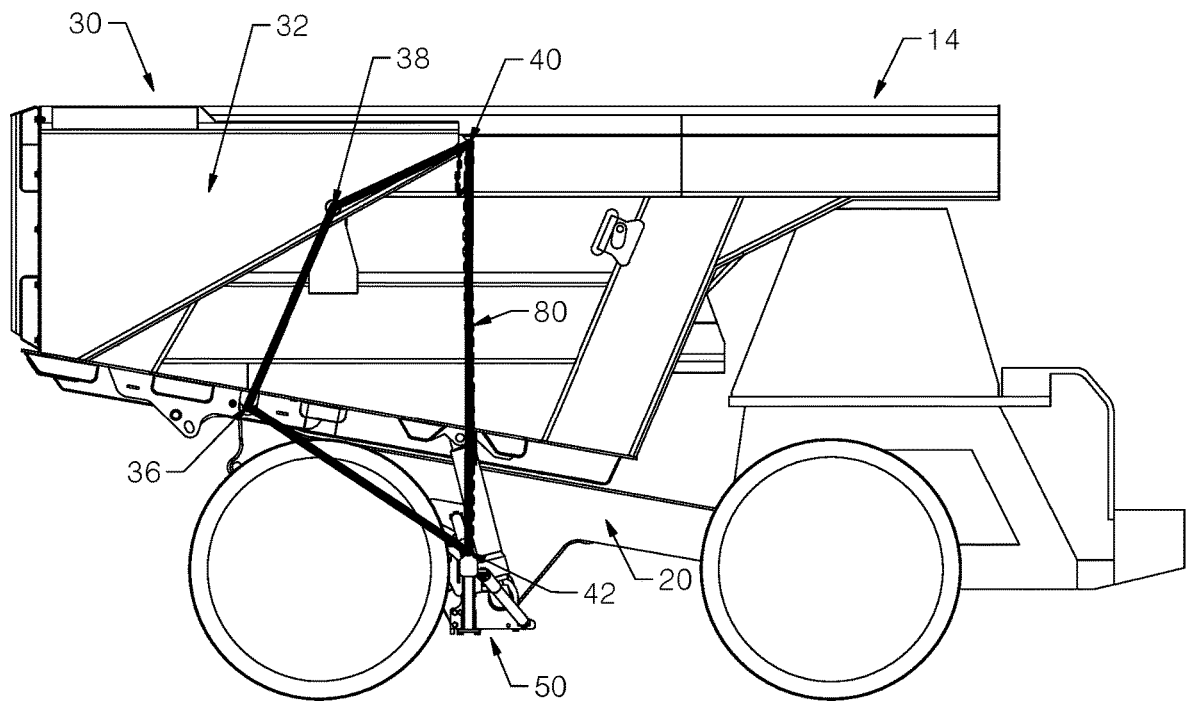
FIG. 3 is a schematic side view of the off-highway truck of FIG. 1 illustrating the four-bar linkage of the tailgate.

The off-highway truck 10 also includes a tailgate 30 configured as an automatic four bar linkage tailgate. The tailgate 30 secures material in the truck body 14 when the truck body 14 is in the material haulage position shown in FIG. 1. The tailgate 30 is supported by two tailgate arms 32 that lift the tailgate 30 from the rear of the truck body 14 as the truck body moves to the dumped position. The four linkage bars that actuate the movement of the tailgate 30 are shown in FIG. 3. These linkage bars are formed between (i) the truck body pivot point 36 and the tailgate rotation pivot point 38 along the truck body, (ii) the tailgate pivot point 38 and the forward tailgate arm pivot point 40 along the tailgate arm 32, (iii) the forward tailgate arm pivot point 40 and the truck frame anchor pivot point 42 along an automatic tailgate actuation link 80, and (iv) the truck frame anchor pivot point 42 and the truck body pivot point 36 along the outrigger arrangement 50 and the truck frame 20.

During operation, as the hoist 24 lifts the truck body 14 from the material haulage position shown in FIG. 1 to the dumped position shown in FIG. 2, the tailgate actuation link 80 causes the tailgate arms 32 to rotate in the opposite direction of the truck body 14, raising the tailgate 30 from the rear opening of the truck body 14. Thus, the outrigger assembly 50 bears the load needed to lift the tailgate 30 and tailgate arms 32 with respect to the truck body 14.

Figure 4:
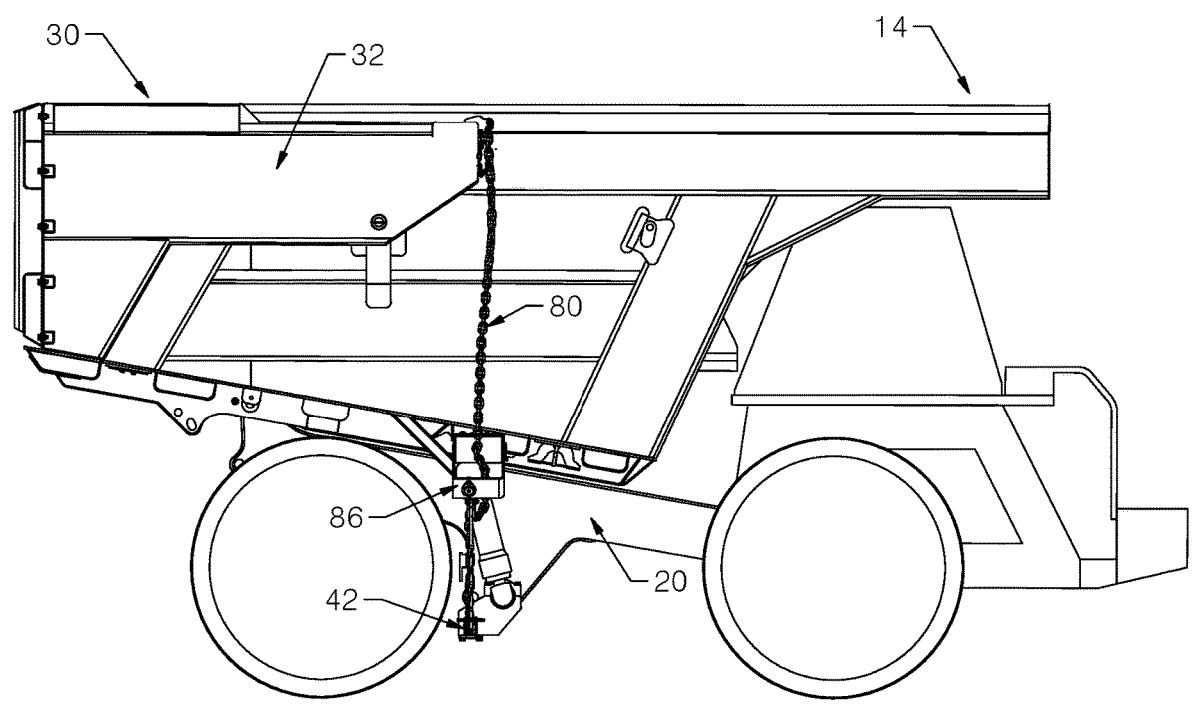
FIG. 4 is a schematic side view of an off-highway truck that includes roller boxes.

FIG. 4 illustrates an embodiment of an off-highway truck that includes roller boxes. The off-highway truck shown in FIG. 4 includes an operating system for an automatic four bar linkage tailgate 30 where the truck frame anchor pivot point 42 is attached directly to the side of the off-highway truck frame 20. The tailgate actuation link 80 is threaded through the automatic roller boxes 86 such that the tailgate actuation link 80 wears as it winds through the automatic tailgate roller boxes 86 around the bottom outside edge of the off-highway truck body 14 and into the off-highway truck frame 20, which is a less than a satisfactory automatic four bar linkage tailgate 30 operating system.

In embodiments of the disclosure, the outrigger assembly that operates with the automatic four bar linkage tailgate is secured to the truck frame using clamps. Details of various embodiments of the outrigger assembly are shown in FIGS. 5-10. In some embodiments, the outrigger assembly is secured to the truck frame without any welds between the outrigger assembly and the truck frame. Further, while the outrigger assembly is illustrated herein in connection with an off-highway truck, in other embodiments of the disclosure, the outrigger assembly may be used with other trucks, such as smaller trucks that are configured to typically operate on public roads.

Figure 5A:
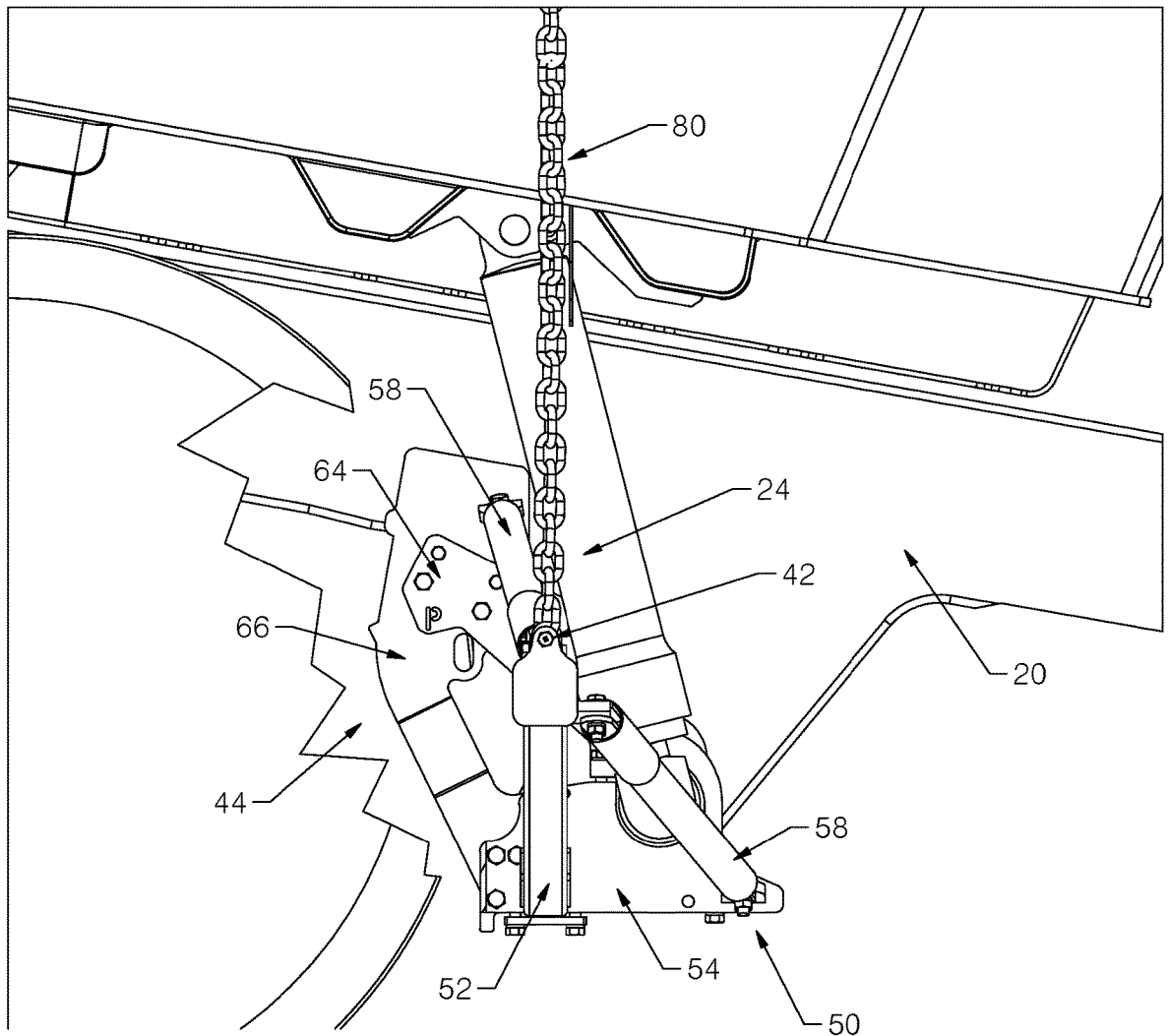
FIG. 5A is a schematic detailed side view of an outrigger arrangement according to an embodiment of the disclosure.
Figure 5B:
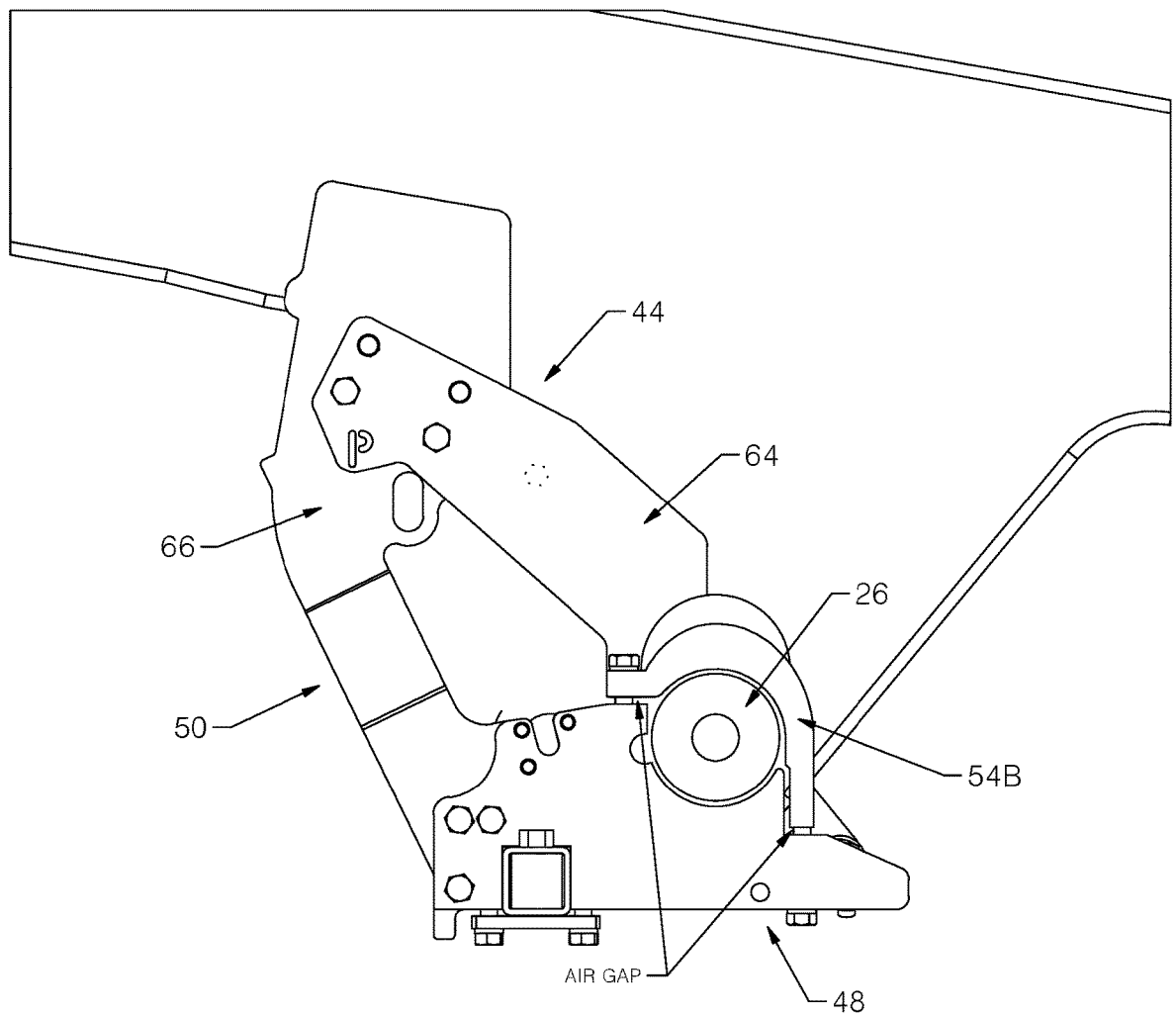
FIG. 5B is a schematic detailed cross-sectional side view of the outrigger arrangement of FIG. 5A.
Figure 6A:
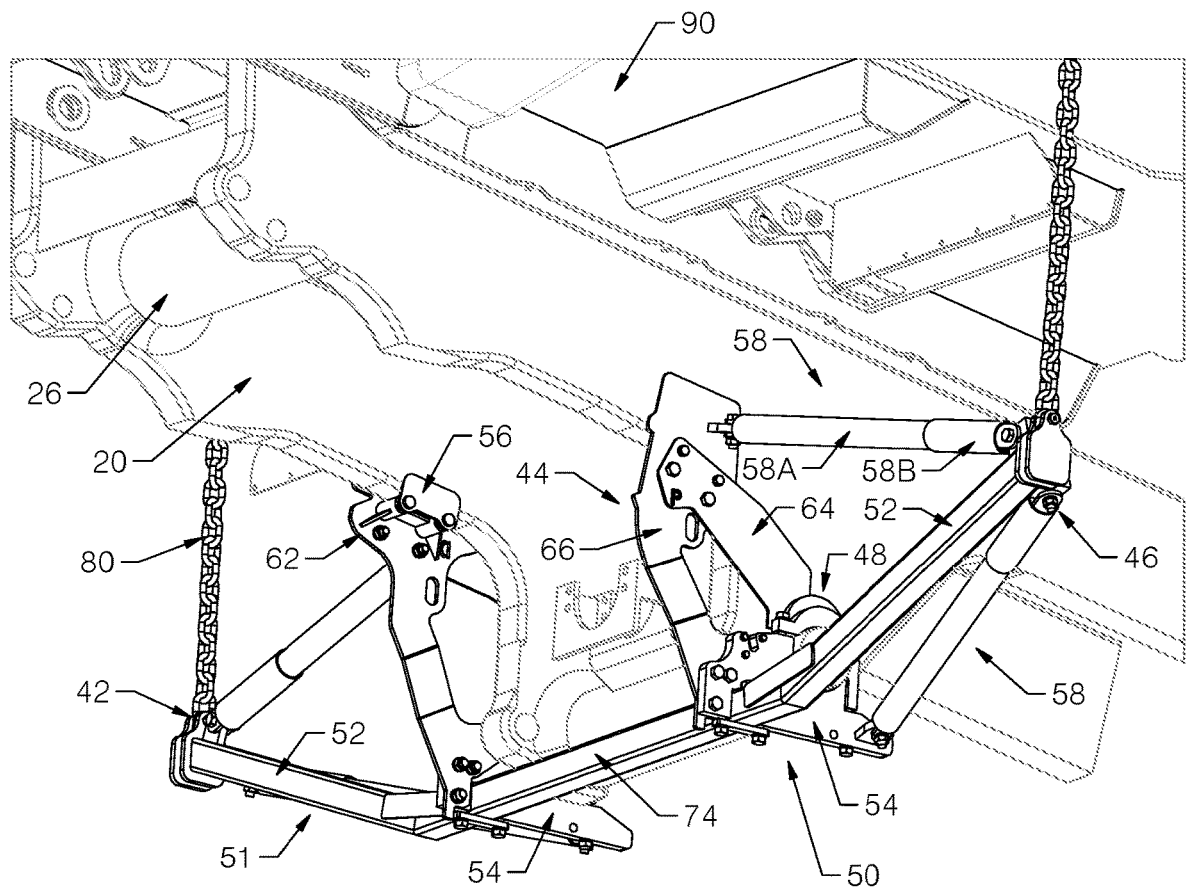
FIG. 6A is a schematic lower isometric view of the outrigger arrangement of FIG. 5A and a portion of an off-highway truck.

FIGS. 5A; 6A & 6B illustrate an outrigger arrangement 50 for providing an automatic four bar linkage tailgate anchor point 42 at the end of an outrigger 52. FIG. 5A shows a portion of a truck frame 20 and a side view of the outrigger arrangement 50 attached to the truck frame 20. FIG. 5B shows portions of the outrigger arrangement 50 of FIG. 5A removed to more clearly show portions of the outrigger arrangement 50 that are obscured in FIG. 5A. FIG. 6A shows a portion of an off-highway truck and the outrigger arrangement 50 secured to components of the off-highway truck. The outrigger arrangement 50 is mechanically fastened to components of a truck. The outrigger arrangement 50 includes an outrigger arrangement support frame 44 and an outrigger 52 that extends outward from the outrigger arrangement support frame 44 to a distal end 46 that is configured to support a tailgate actuation link 80. The connection between the tailgate actuation link 80 and the distal end 46 of the outrigger 52 may serve as the automatic four bar linkage tailgate anchor point 42. The outrigger 52 may be supported by one or more outrigger braces 58 that extend between the outrigger arrangement support frame 44 and the distal end 46 of the outrigger 52.

Figure 6B:
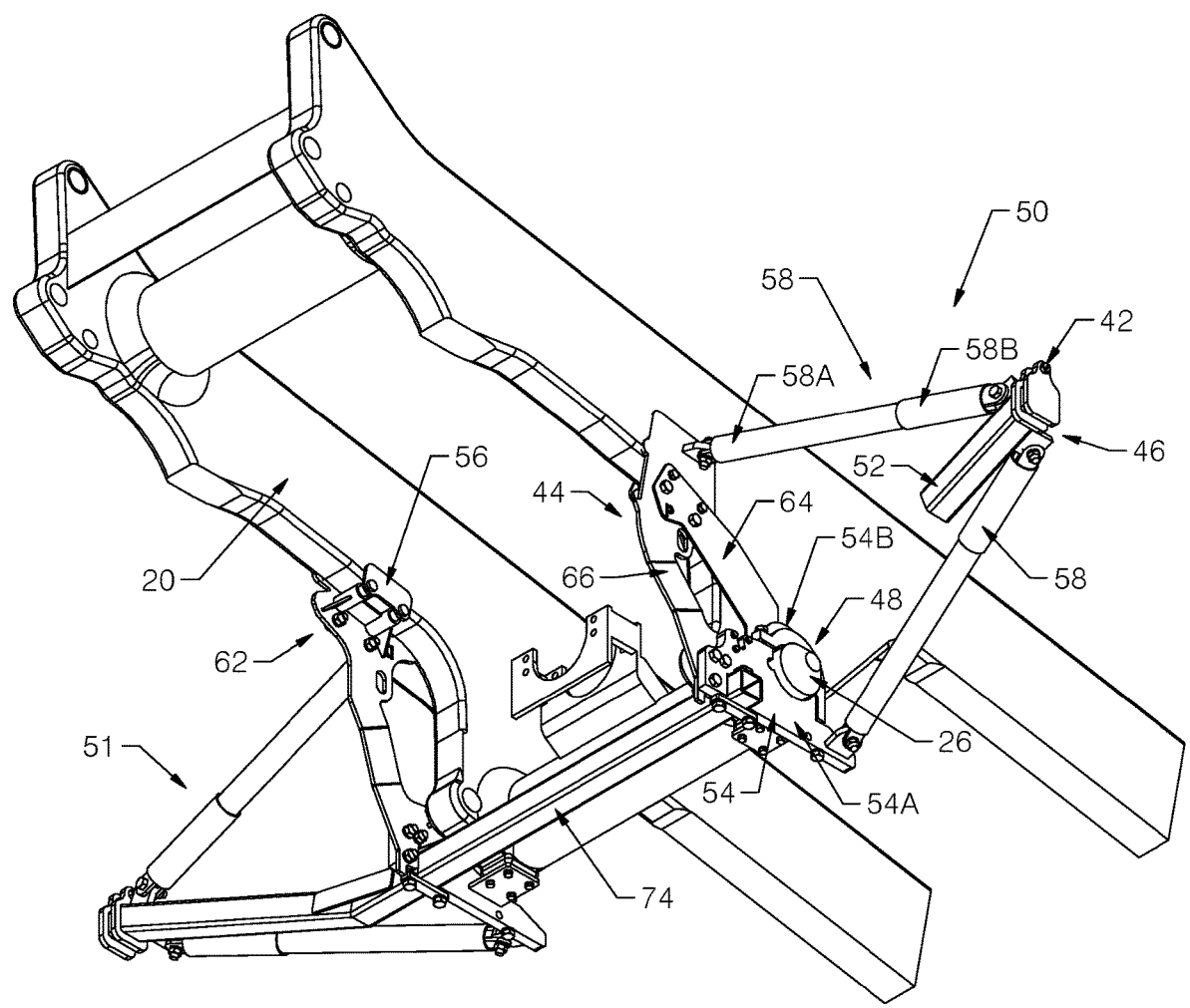
FIG. 6B is a schematic lower isometric view of the outrigger arrangement of FIG. 5A with a portion removed to reveal obscured features.
Figure 6C:
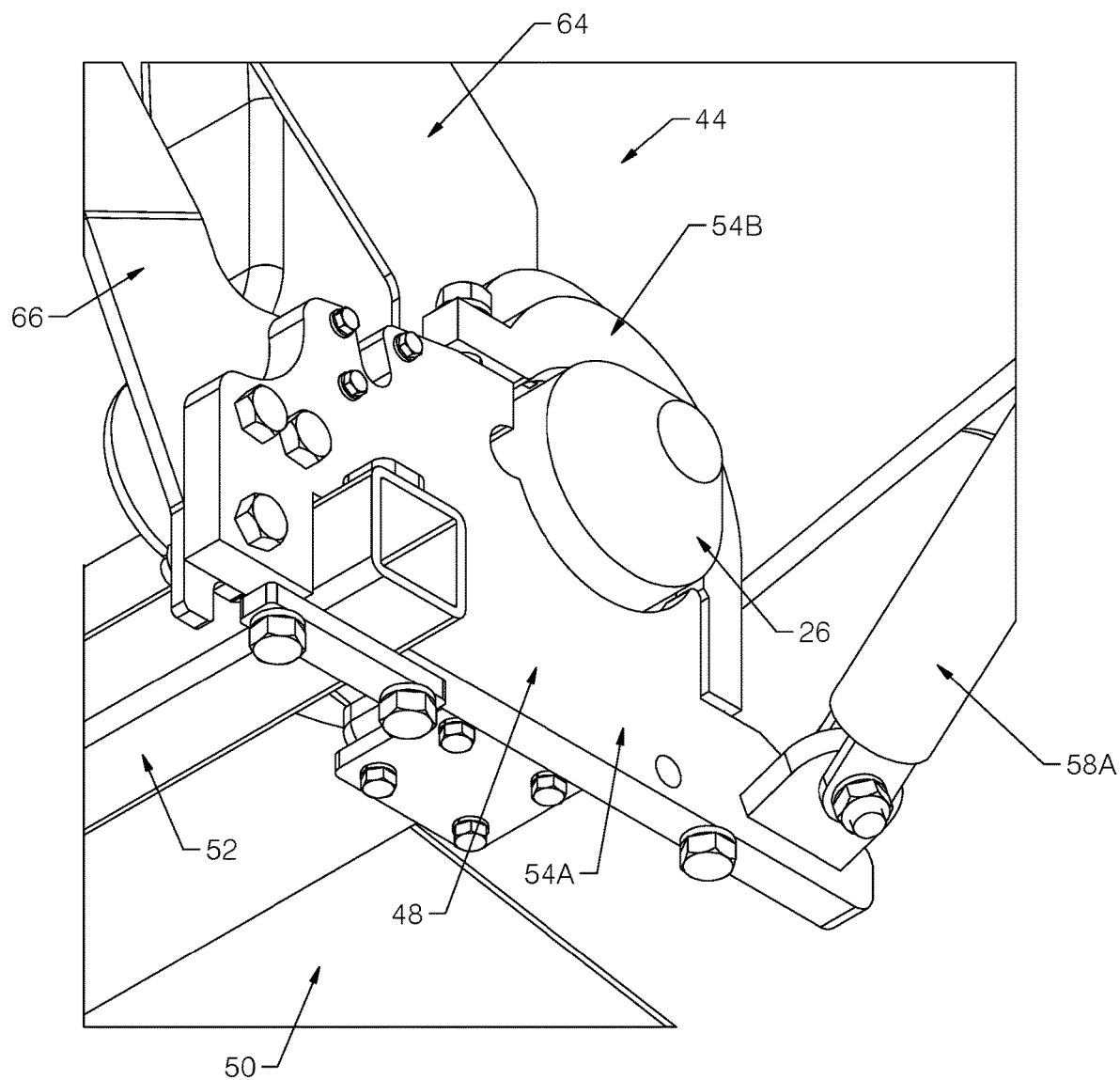
FIG. 6C is a detailed view of a portion of FIG. 6B.

FIG. 6B shows the outrigger arrangement 50 as shown in FIG. 6A, with a portion of outrigger 52 removed to more clearly show parts of support frame 44. Further, FIG. 6C shows a detailed view of a portion of FIG. 6B. As shown in FIGS. 5B, 6B and 6C, the outrigger arrangement 50 may include a lower clamp 48 that is configured to secure the outrigger arrangement support frame 44 to a lateral support 26 of the truck. The outrigger arrangement 50 may also include a truck frame clamp 62, as shown in FIGS. 6A and 6B, that is configured to secure the outrigger arrangement support frame 44 to the truck frame 20.

In some embodiments, the outrigger arrangement support frame 44 may include a plurality of support plates. For example, the outrigger arrangement support frame 44 shown in FIGS. 5A-6C includes three support plates including a base plate 54, an angled front plate 64 and an angled rear plate 66 arranged in a triangle. In other embodiments the outrigger arrangement support frame 44 may include fewer plates, such as a single plate, or more than three plates. Moreover, in some embodiments, the outrigger arrangement support frame 44 may be formed by other structural components, such as a configuration of beams, or a combination of beams and plates that form a supporting structure.

FIGS. 6B and 6C more clearly show the configuration of the lower clamp 48 of the outrigger arrangement 50. In some embodiments, the lower clamp 48 may be formed by a base plate 54 of the outrigger arrangement support frame 44. For example, in the embodiment shown in FIGS. 6B and 6C, the lower clamp 48 is formed by two components of the base plate 54, including a lower component 54A and an upper component 54B. The upper component 54B is secured to the lower component 54A using mechanical fasteners, which allows distance between the upper component 54B and lower component 54A to be adjusted. Accordingly, a lateral support 26 positioned between the lower component 54A and upper component 54B such that the lower component 54A and upper component 54B can be clamped onto the lateral support 26 by reducing the distance between the components 54A, 54B.

In other embodiments, the base plate 54 may form the lower clamp 48 using other configurations. For example, in some embodiments, the base plate 54 may include a first side component and a second side component that are secured around the lateral support. Further, in some embodiments, the lower clamp 48 can be formed in another manner. For example, in some embodiments, the lower clamp 48 can be formed between two plates of the outrigger support frame 44. In other embodiments, the lower clamp may have another configuration. In some embodiments the lower clamp 48 forms a tight fixed attachment to the lateral support 26. In other embodiments, the lower clamp 48 can loosely fit around the lateral support 26 and the stability of the outrigger arrangement may be provided by the use of more than one clamp holding the arrangement in place.

In some embodiments, the lateral support 26 is a hoist mount of the truck that is configured to support a hoist 24 for lifting the truck body 14, as shown in FIG. 2. In other embodiments the lateral support 26 may be another component of the truck, such as a support beam of the truck frame or another structure of the truck.

FIGS. 6A-6B show a truck frame clamp 62 that secures the outrigger arrangement 50 to the truck frame 20. A portion of the truck frame clamp 62 may be more clearly seen on the outrigger arrangement 51 on the far side of the truck frame 20. The truck frame clamp 62 includes a clamping plate 56 that is spaced from the outrigger arrangement support frame 44. In some embodiments, the clamping plate 56 may be secured to the outrigger arrangement support frame 44 using mechanical fasteners so as to provide an adjustable distance between the clamping plate 56 and the outrigger arrangement support frame 44. Accordingly, as shown in FIGS. 6A-6B, the outrigger arrangement support frame 44 may be positioned on the outside of the truck frame 20, while the clamping plate 56 is positioned on the inside of the support frame. The distance between the clamping plate 56 and the outrigger arrangement support frame 44 may then be reduced until the truck frame clamp 62 provides a secure fit on the truck frame 20. In some embodiments, the clamping plate 56 and a plate of the outrigger arrangement support frame 44, such as angled rear plate 66, may be formed as flat plates that are aligned in parallel on either side of the truck frame 20. In other embodiments, one or more components of the truck frame clamp 62 may wrap around a part of the truck frame 20 and conform to the shape of the truck frame 20.

In some embodiments, each of the outrigger braces includes a first section attached to a second section. For example, as shown in FIGS. 6A-6B, the outrigger braces 58 may each be formed of a first section 58A coupled to a second section 58B. In the illustrated embodiments, the first and second sections 58A, 58B are embodied as nested tubes. In other embodiments, the sections of the outrigger braces 58 may have another configuration, such as attached beams, for example. In some embodiments, the length of the outrigger brace 58 may be variable based on the position of attachment between the first section 58A and the second section 58B. For example, the first section 58A and the second section 58B of the outrigger braces 58 may be moved with respect to one another until a desired length of the outrigger brace 58 is established. The two sections 58A, 58B can then be welded to one another to establish the desired length of the outrigger brace 58. Still, in other embodiments, the outrigger brace 58 can be formed by a single member, such as a beam or tube, with a predefined length.

In some embodiments, the outrigger 52 is part of a beam 74 that extends through the outrigger arrangement support frame 44 to a second outrigger arrangement 51. For example, as shown in FIGS. 6A and 6B, beam 74 extends across truck frame 20 and forms the outrigger 52 for a first outrigger arrangement 50 and the outrigger 52 for a second outrigger arrangement 51. In some embodiments, the beam 74 may be formed by a single continuous member. In other embodiments, the beam 74 may be formed by several member sections that are secured to one another, for example by welding.

Figure 7A:
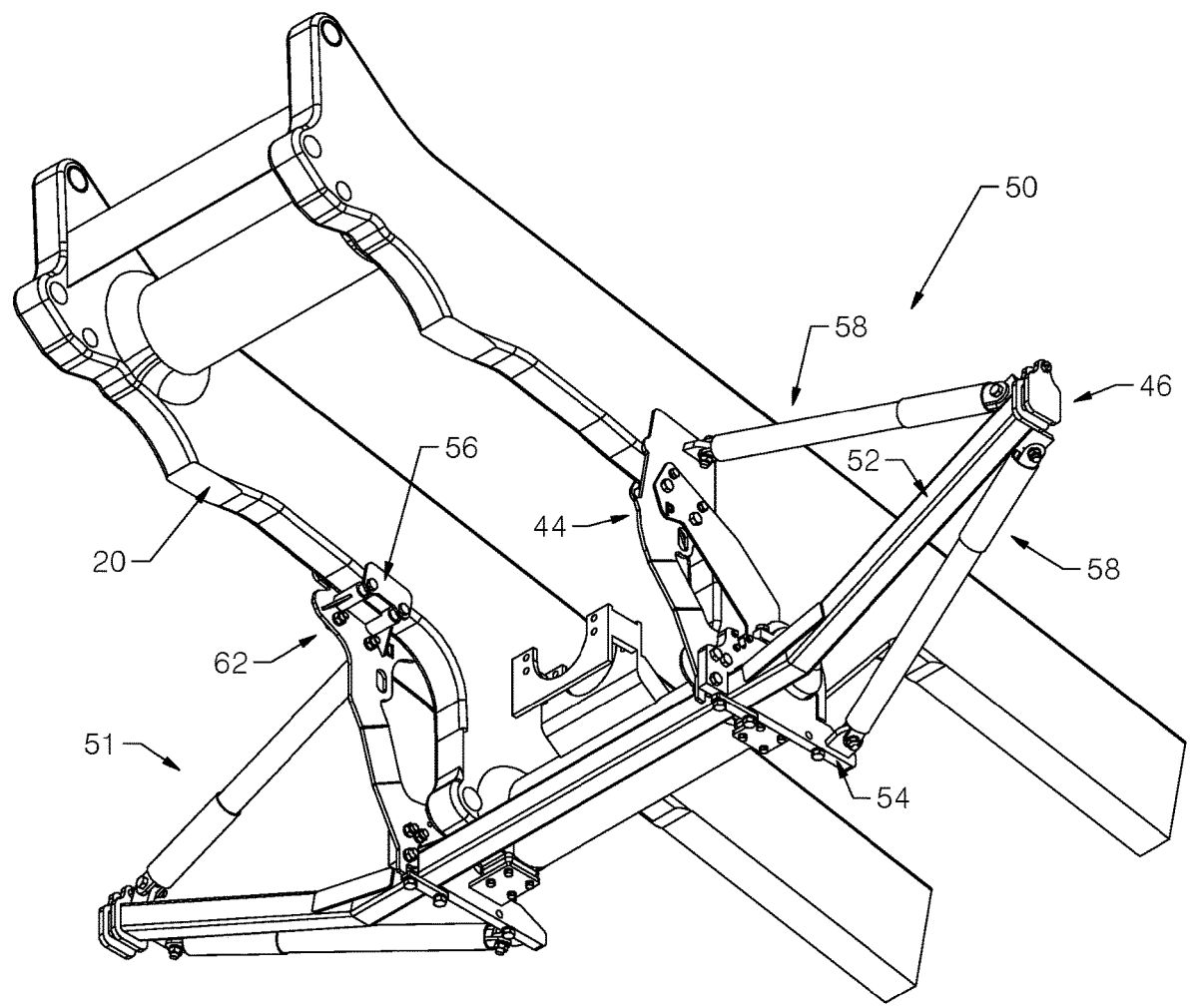
FIG. 7A is a schematic lower isometric view of the outrigger arrangement of FIG. 5A attached to a truck frame.
Figure 7B:
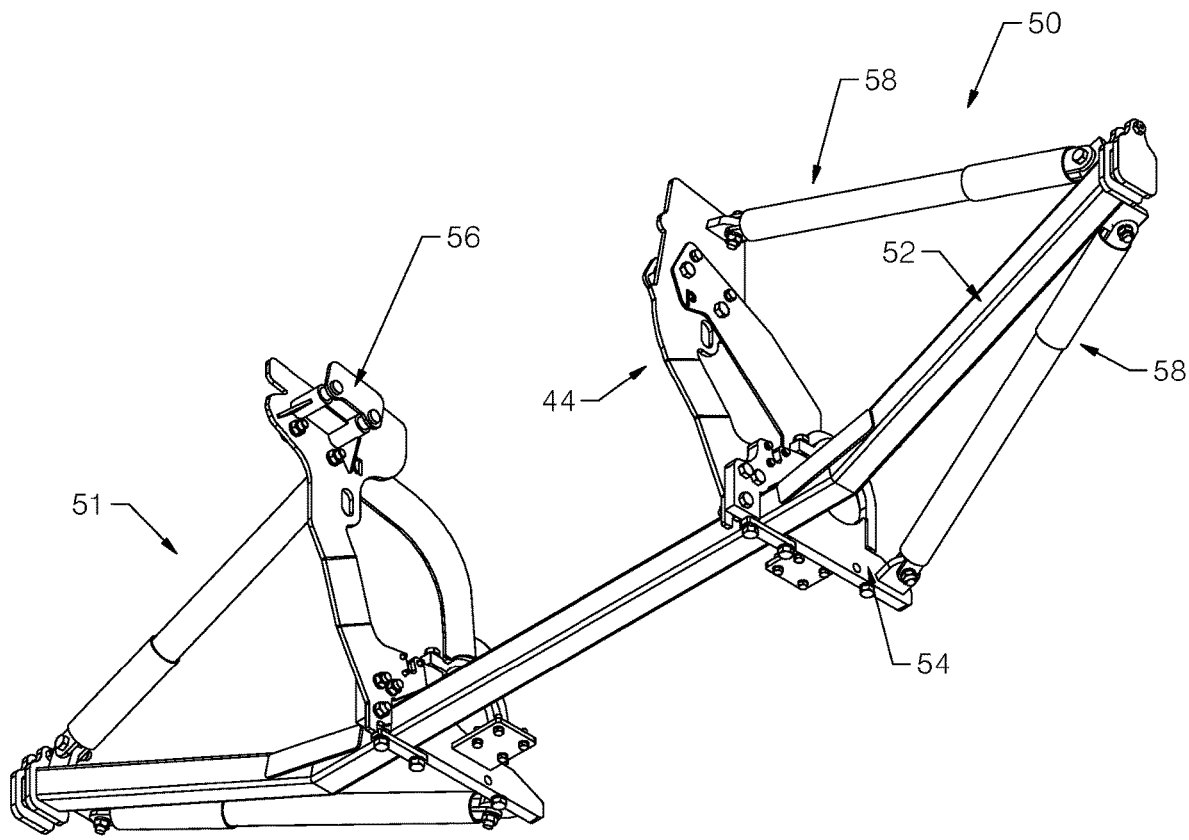
FIG. 7B is a schematic lower isometric view of the outrigger arrangement, as shown in FIG. 7A, without the truck frame.
Figure 7C:
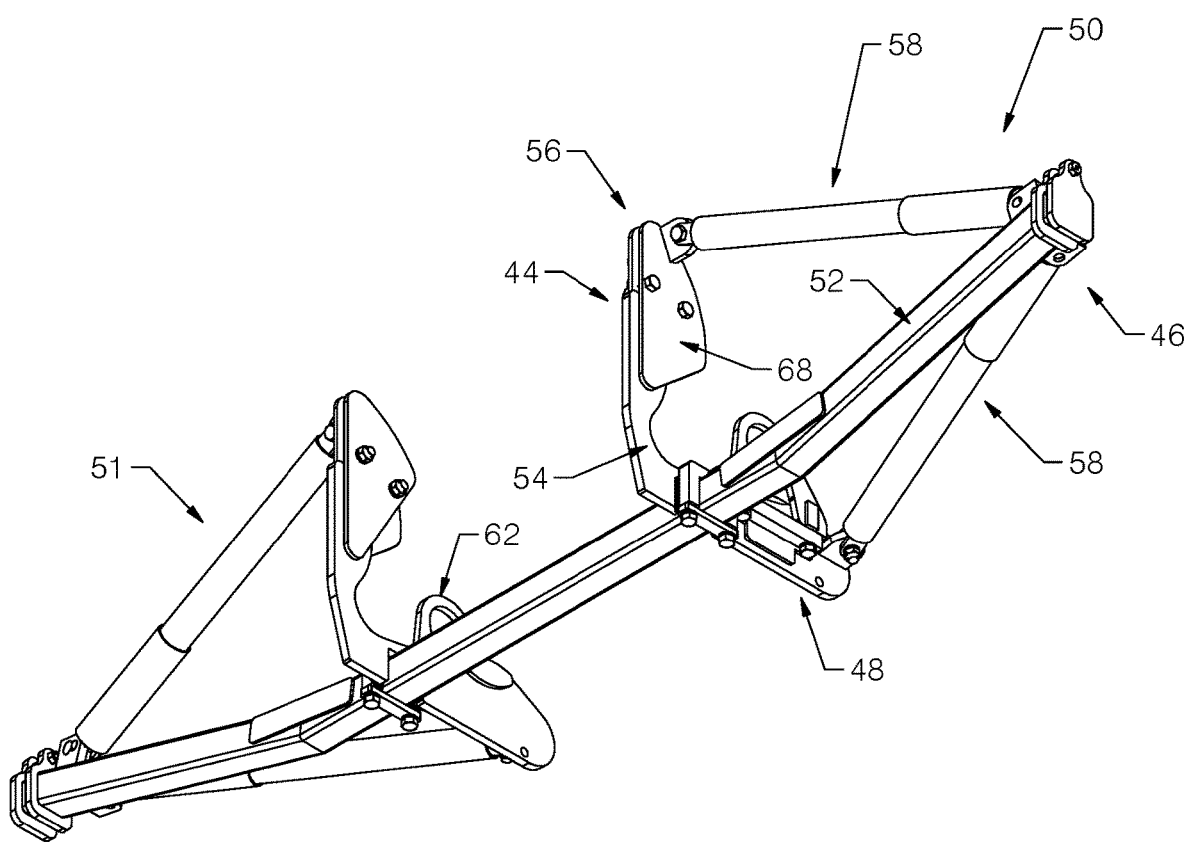
FIG. 7C is a schematic lower isometric view of an outrigger arrangement according to another embodiment of the disclosure.

FIG. 7A shows a lower isometric view of the outrigger arrangements 50, 51 of FIGS. 6A & 6B secured to a truck frame 20. FIG. 7B shows the same view of the outrigger arrangements 50, 51 with the truck frame removed, for clarity. FIG. 7C shows another embodiment of a pair of outrigger arrangements 50, 51 configured to attach to components of a truck. Similar to the outrigger of FIGS. 5A-7B, the outrigger arrangement 50 shown in FIG. 7C includes an outrigger arrangement support frame 44 that supports an outrigger 52. The outrigger 52 is configured to secure to an automatic tailgate actuation link at a distal end 46 thereof, similar to the previously described embodiments. The outrigger arrangement support frame 44 is formed by a base plate 54 and an upper plate 68. A lower clamp 48 is configured to attach the outrigger arrangement support frame 44 to a lateral support of the truck. Further, a truck frame clamp 62 is formed by a truck frame clamp plate 56 that is positioned at distance from the upper plate 68 of outrigger arrangement support frame 44, so as to provide a clamping space between the truck frame clamp plate 56 and the upper plate 68.

Figure 8A:
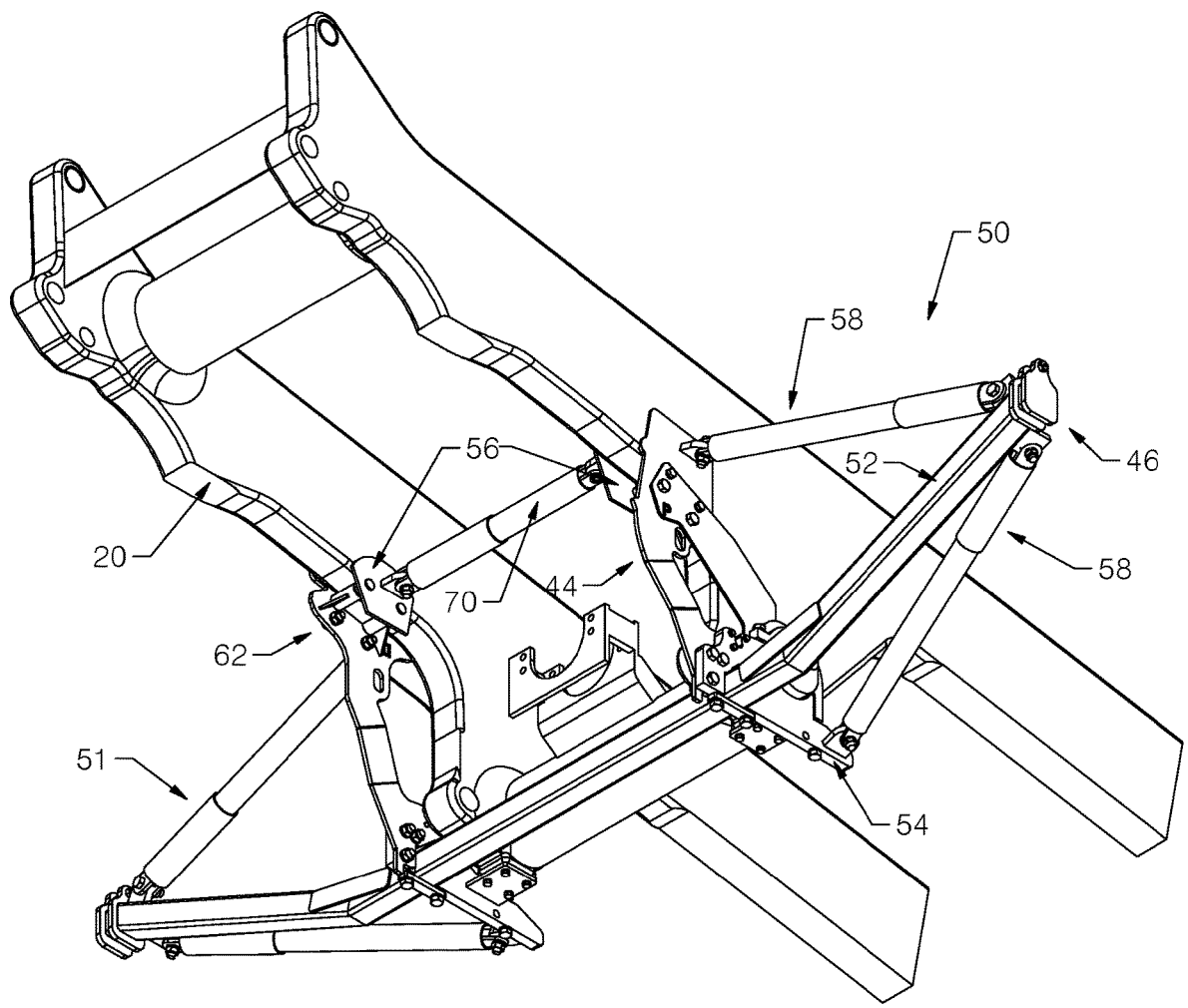
FIG. 8A is a schematic lower isometric view of the outrigger arrangement of FIG. 5 attached to a truck frame and with a cross member.
Figure 8B:
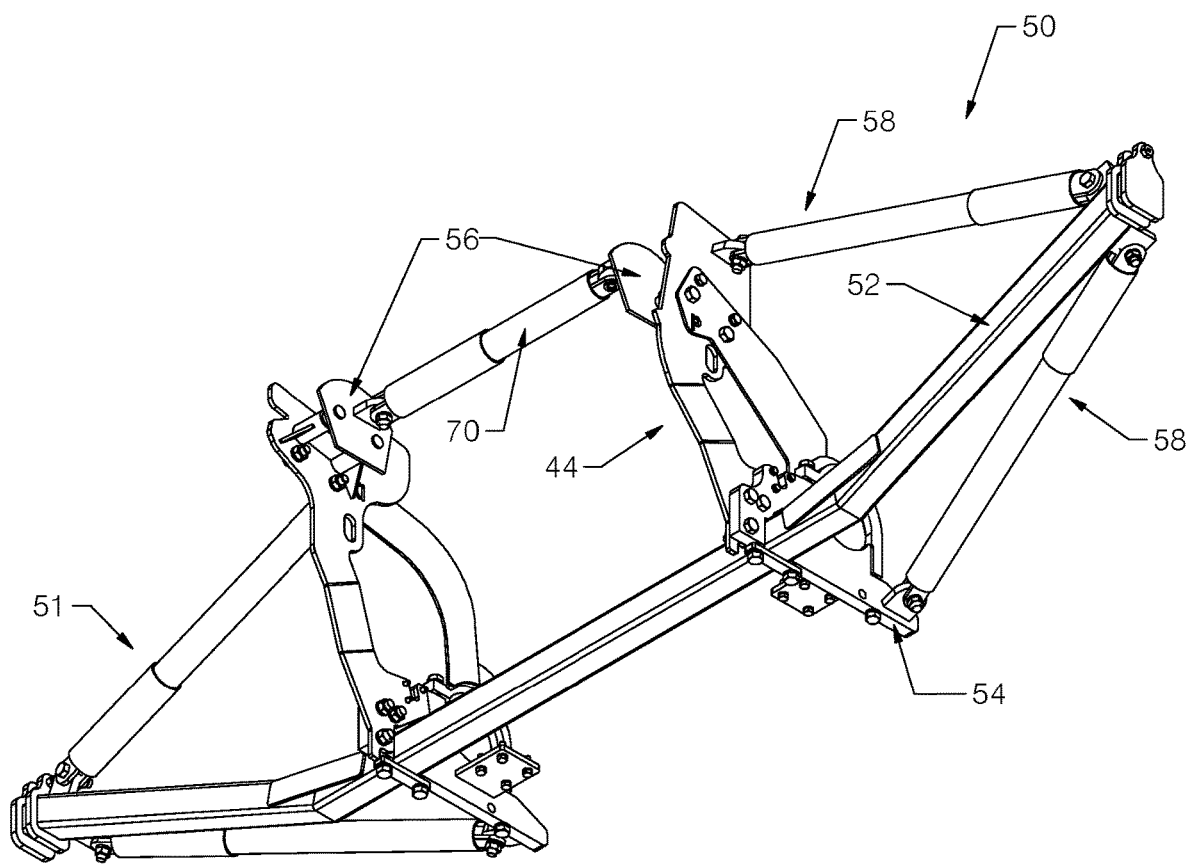
FIG. 8B is a schematic lower isometric view of the outrigger arrangement, as shown in FIG. 8A, without the truck frame.
Figure 8C:
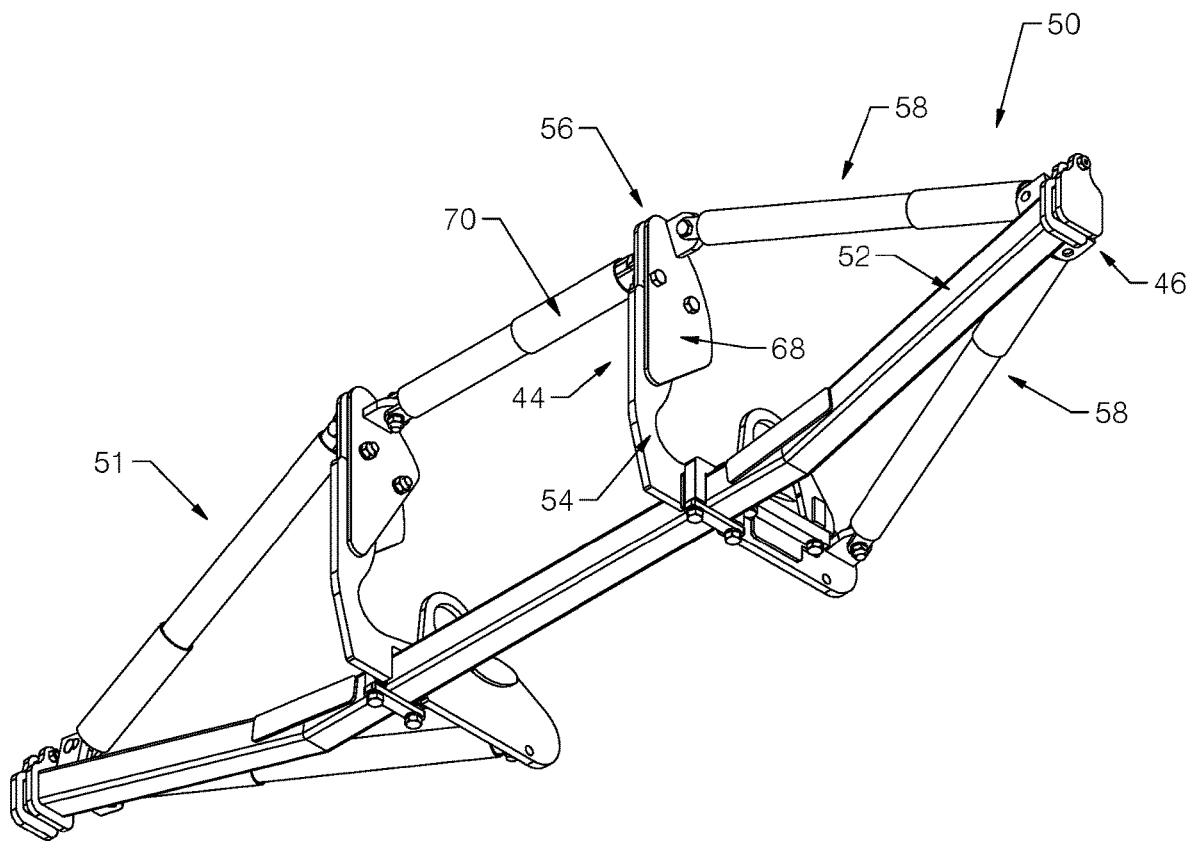
FIG. 8C is a schematic lower isometric view of the outrigger arrangement of FIG. 7C with a cross member.

In some embodiments, the clamping plate of the outrigger arrangement is coupled to a cross member configured to attach to a second outrigger arrangement. For example, FIG. 8A is identical to FIG. 7A with the addition an adjustable cross member 70 spanning and bridging the distance between a first outrigger arrangement 50 on one side of the truck frame 20 and a second outrigger arrangement 51 on the other side of the truck frame 20. The adjustable cross member 70 extends from the clamping plate 56 of the first outrigger arrangement 50 to a clamping plate 56 of the second outrigger arrangement 51. FIG. 8B shows the configuration of FIG. 8A with the truck frame removed for clarity. Further, FIG. 8C shows an embodiment of the outrigger arrangements 50, 51 having a similar configuration to that of FIG. 7C, but also with the addition of an adjustable cross member 70 between the first outrigger arrangement 50 and the second outrigger arrangement 51.

Figure 9A:
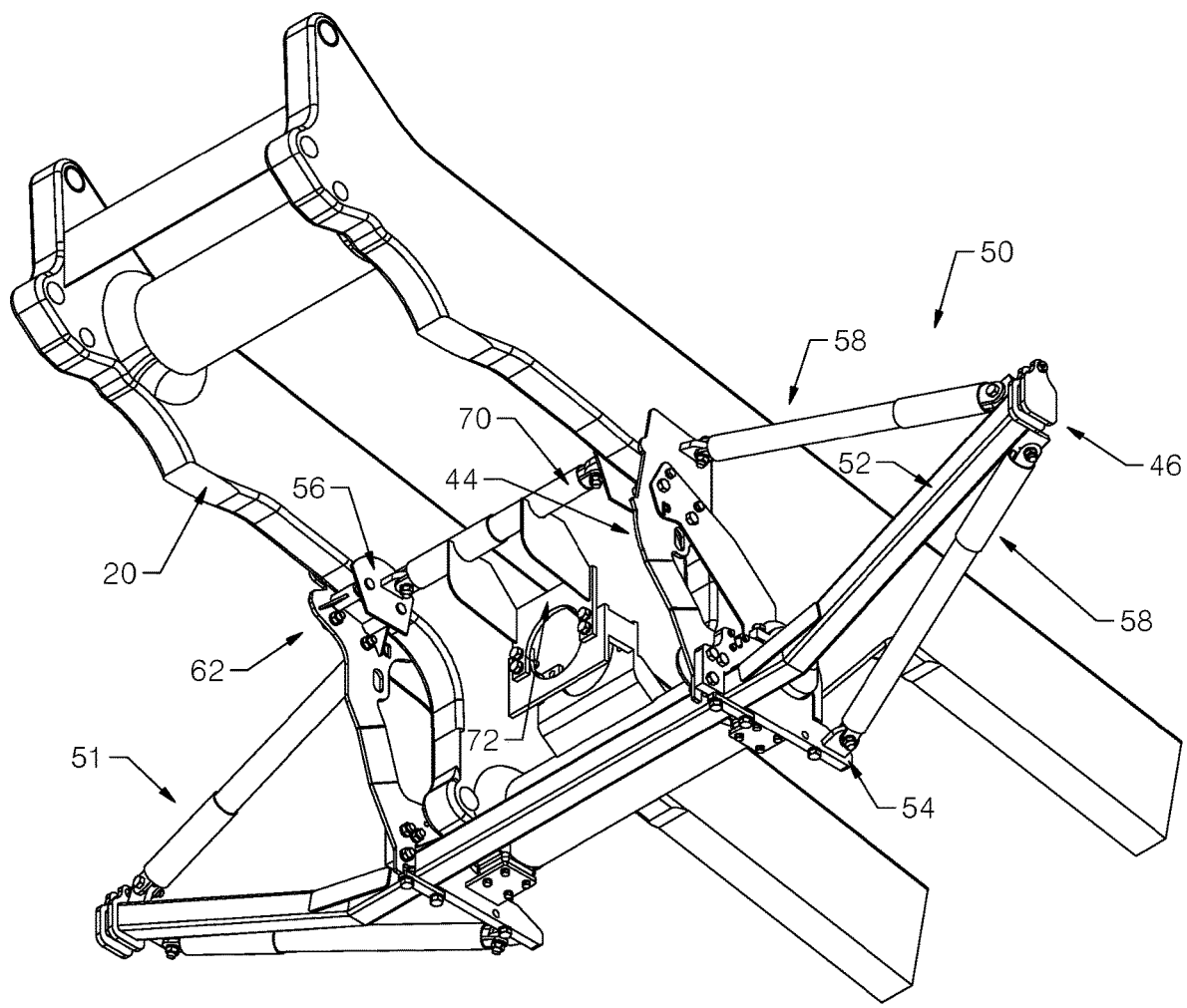
FIG. 9A is a schematic lower isometric view of the outrigger arrangement of FIG. 5 attached to a truck frame and with a cross member and shaft protection collar.
Figure 9B:
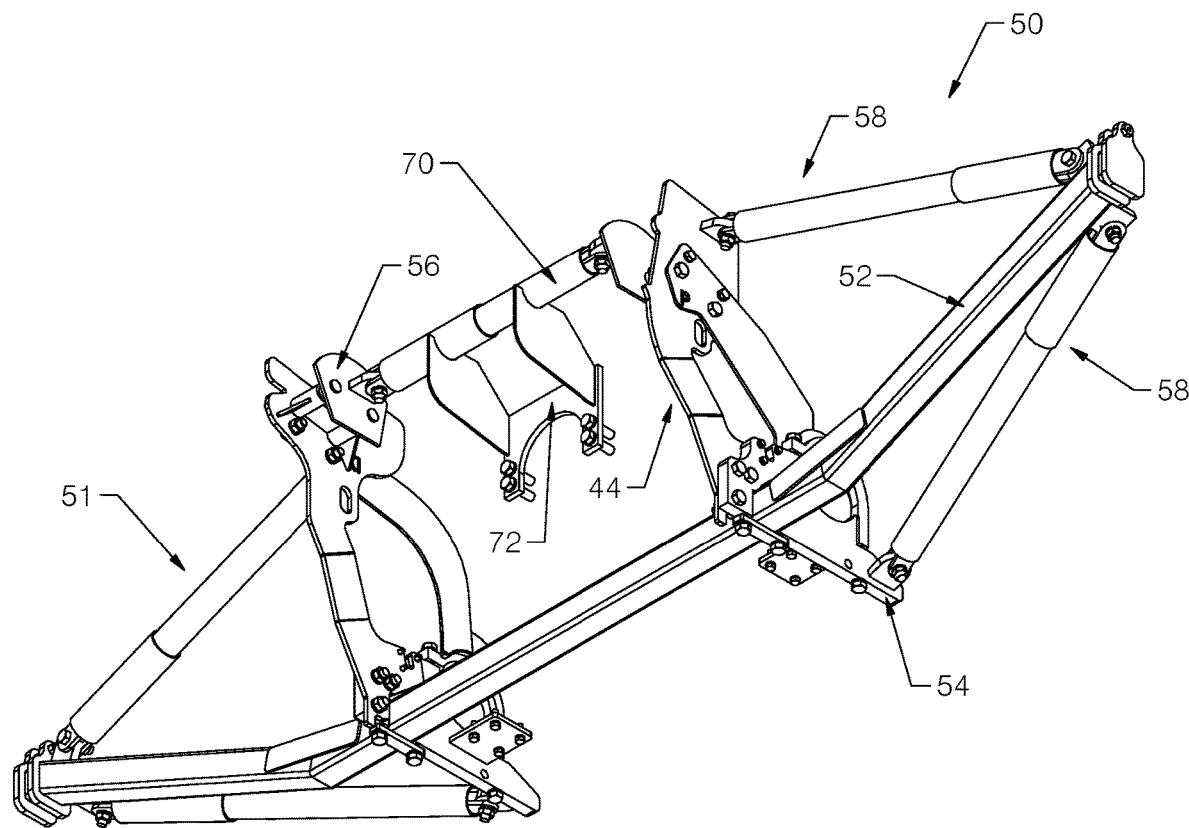
FIG. 9B is a schematic lower isometric view of the outrigger arrangement, as shown in FIG. 9A, without the truck frame.
Figure 9C:
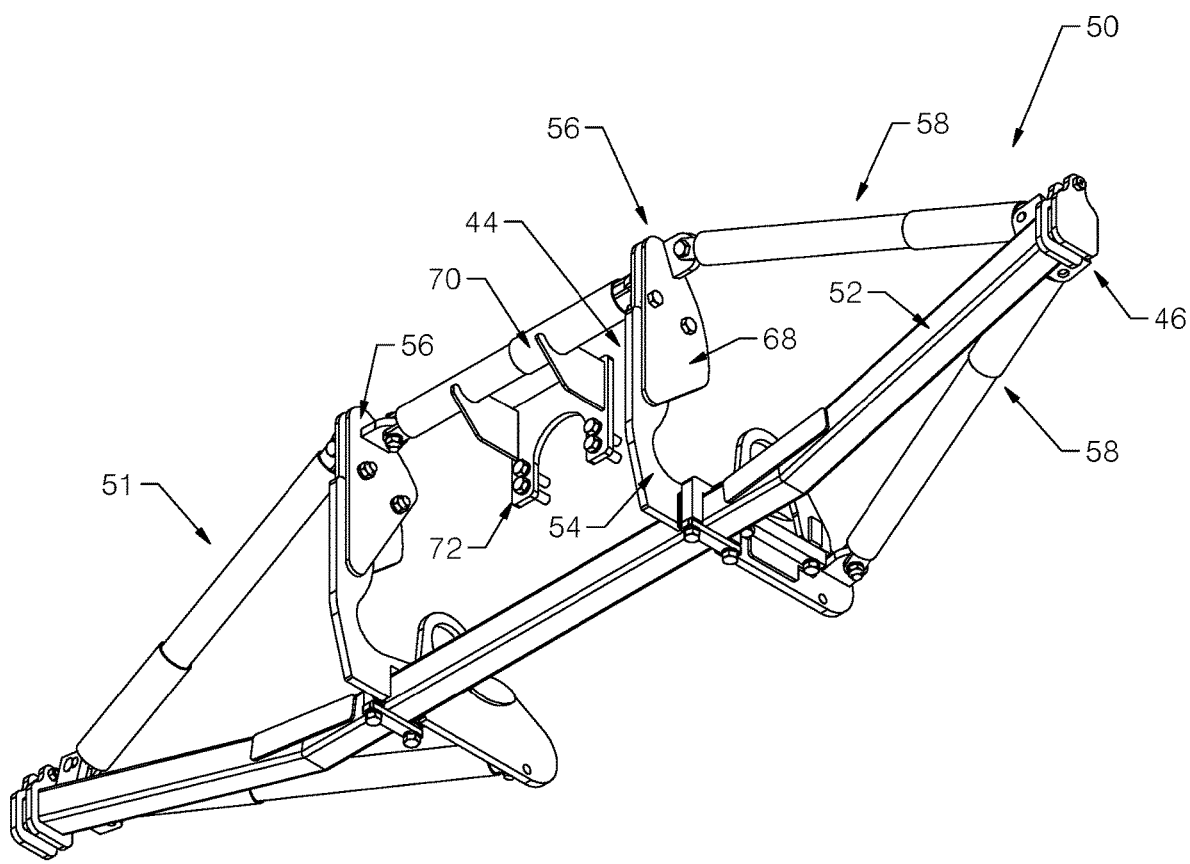
FIG. 9C is a schematic lower isometric view of the outrigger arrangement of FIG. 7C with a cross member and shaft protection collar.

In some embodiments, a drive shaft protection collar is coupled to the cross member. For example, FIG. 9A is identical to FIG. 8A with the addition of a drive shaft collar 72 attached to the adjustable cross member 70. The drive shaft collar 72 is configured to surround a drive shaft of the truck to protect the drive shaft and further support the outrigger arrangements. FIG. 9B shows the configuration of FIG. 9A with the truck frame removed for clarity. Further, FIG. 9C shows an embodiment of the outrigger arrangements 50, 51 having a similar configuration to that of FIG. 8C, but also with the addition of a drive shaft collar 72 attached to the adjustable cross member 70.

Figure 10A:
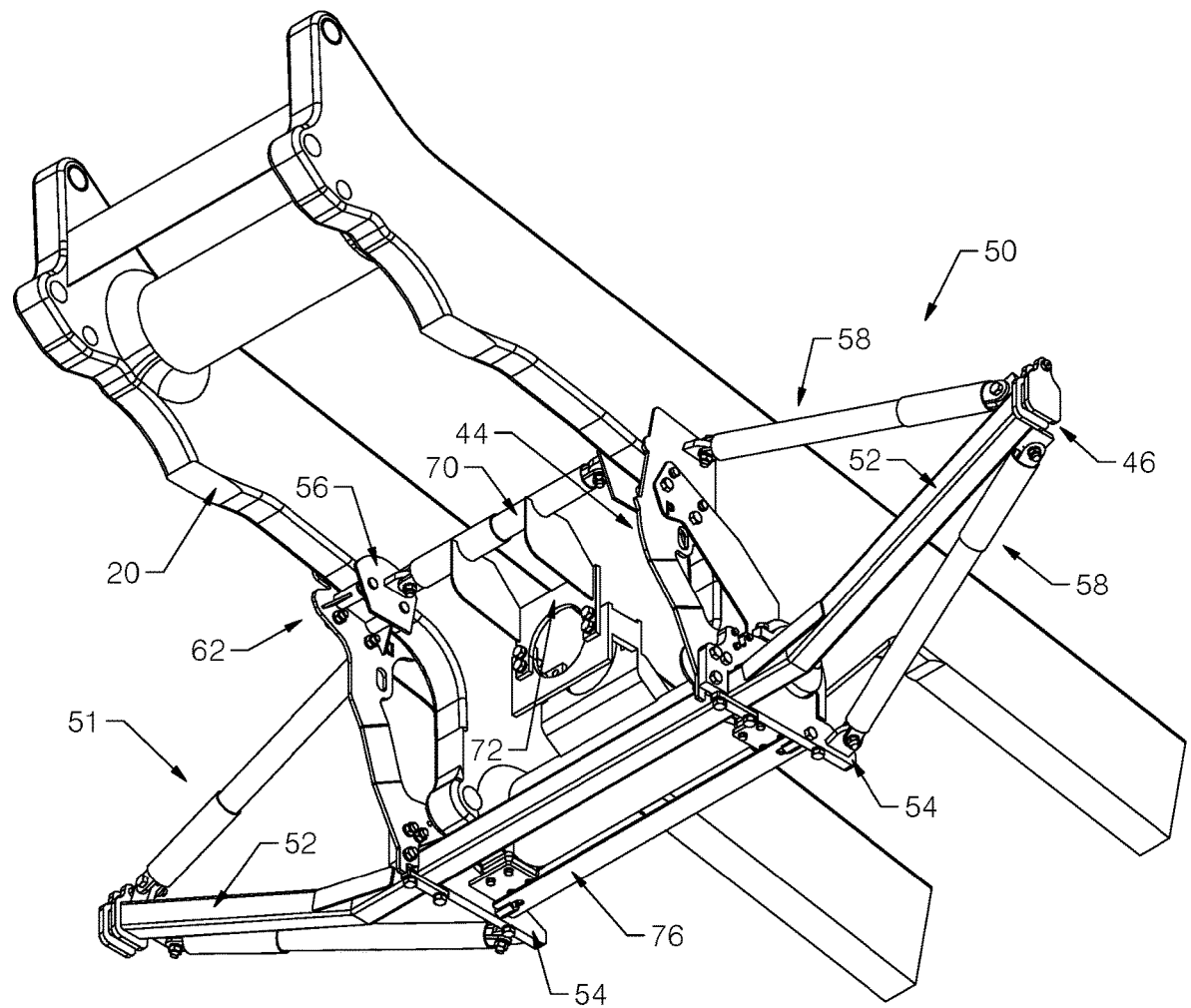
FIG. 10A is a schematic lower isometric view of the outrigger arrangement of FIG. 7A attached to a truck frame and with a cross member, shaft protection collar, and front cross support member.
Figure 10B:
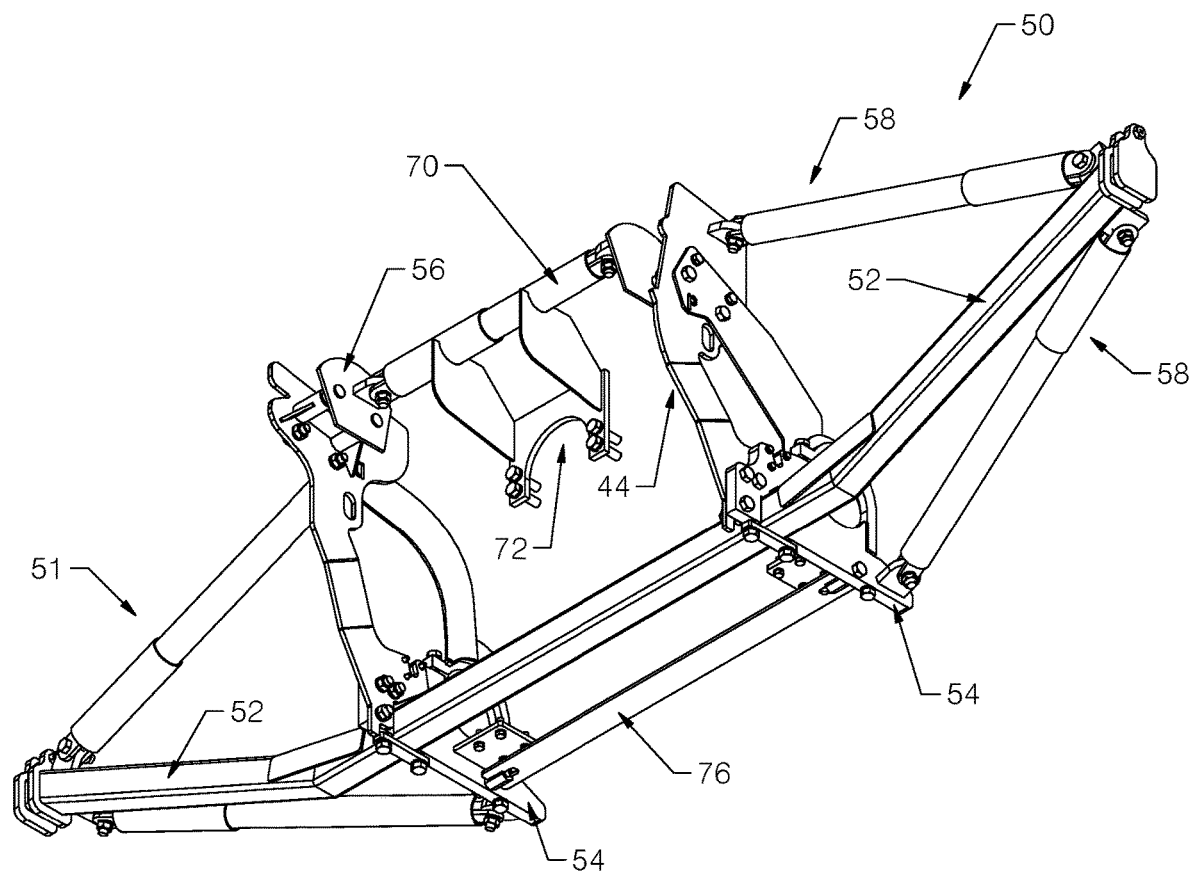
FIG. 10B is a schematic lower isometric view of the outrigger arrangement, as shown in FIG. 10A, without the truck frame.
Figure 10C:
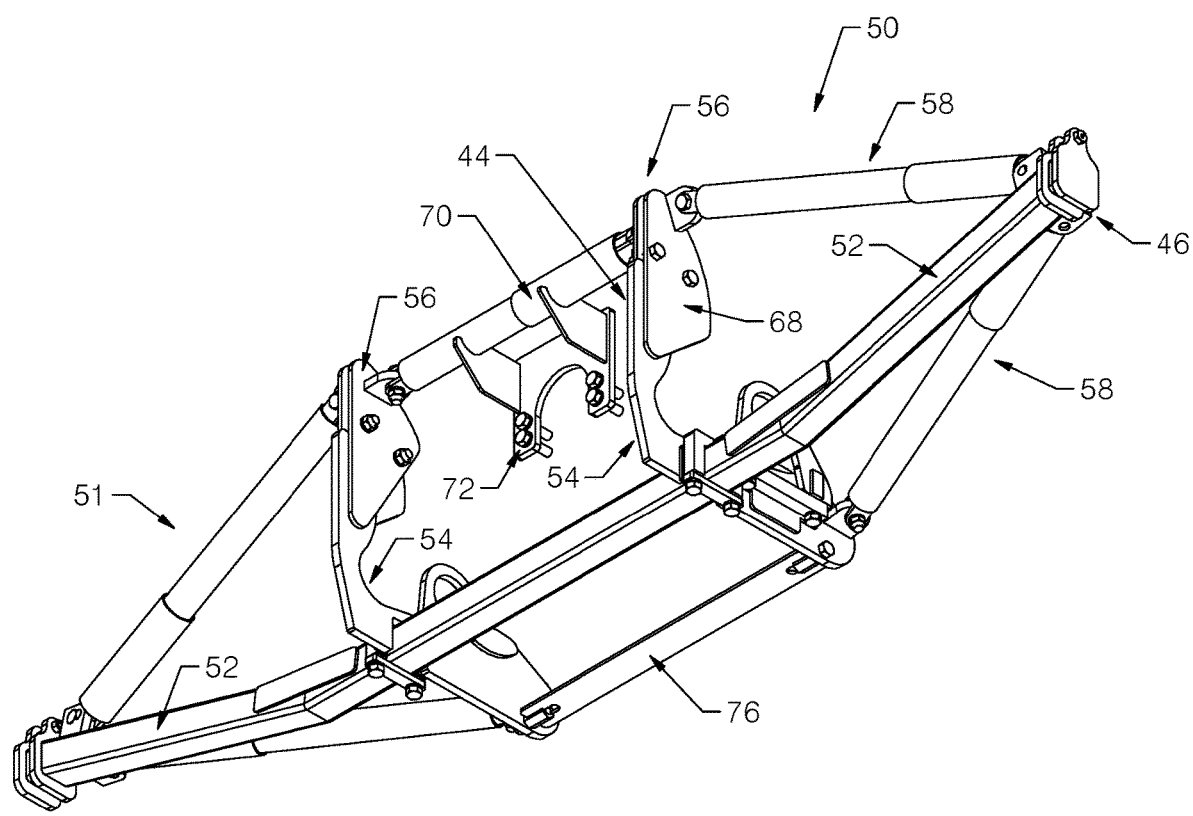
FIG. 10C is a schematic lower isometric view of the outrigger arrangement of FIG. 7C with a cross member, shaft protection collar, and front cross support member.

In some embodiments, a front cross support member extends between the outrigger arrangement support frame of the first outrigger arrangement and the outrigger arrangement support frame of the second outrigger arrangement. For example, FIG. 10A is identical to FIG. 9A with the addition of a front cross support member 76 that extends from a front end of the base plate 54 of the first outrigger arrangement 50 to a front end of the base plate 54 of the second outrigger arrangement 51. The front cross support member 76 may prevent the front ends of the base plates 54 from diverging outward when a rearward force is exerted on the distal end of the outriggers 52 during a dumping operation. The front cross support member 76 may be mechanically fastened to the base plates 54, for example using bolts, or can be welded to the base plates. FIG. 10B shows the configuration of FIG. 10A with the truck frame removed for clarity. Further, FIG. 10C shows an embodiment of the outrigger arrangements 50, 51 having a similar configuration to that of FIG. 9C, but also with the addition of a front cross support member 76 attached to the respective base plates 54 of the first outrigger arrangement 50 and second outrigger arrangement 51.

In another aspect, the disclosure provides a truck structure for use with an automatic four bar linkage tailgate. For example, FIG. 6A shows a truck structure 90 that includes a truck frame 20, a lateral support 26 that extends across the truck frame 20, and first and second outrigger arrangements 50, 51 on either side of the truck frame 20. The first outrigger arrangement 50 and second outrigger arrangement 51 each includes an outrigger arrangement support frame 44 and an outrigger 52 extending outward from the outrigger arrangement support frame 44 to a distal end 46 configured to support a tailgate actuation link of the automatic four bar linkage tailgate. A respective group of outrigger braces 58 extend from each of outrigger arrangement support frames 44 to the distal ends 46 of the outrigger 52. Likewise, each outrigger arrangement 50, 51 also includes a lower clamp 48 configured to secure the respective outrigger arrangement support frame 44 to the lateral support 26, and a truck frame clamp 62 configured to secure the respective outrigger arrangement support frame 44 to the truck frame 20.

In some embodiments, the outrigger 52 of the first outrigger arrangement 50 and the outrigger 52 of the second outrigger arrangement 51 are both part of a beam 74 that extends from the first outrigger arrangement 50 to the second outrigger arrangement 51. In some embodiments, the beam 74 extends through the outrigger arrangement support frame 44 of the first outrigger arrangement 50 and the outrigger arrangement support frame 44 of the second outrigger arrangement 51. In other embodiments, the beam 74 may pass over, under, or around the support frames. Further, in some embodiments, each of the outrigger arrangements 50, 51 are independent and secured to the respective sides of the truck frame 20 without being connected by a shared beam.

In some embodiments, the lateral support 26 is a hoist mount configured to support a hoist 24 for raising a truck body. In other embodiments, the lateral support 26 is another structure that extends across the structure of the truck. For example, in some embodiments, the lateral support is lateral structural component of the truck frame.

In some embodiments, the truck structure includes a cross member 70 extending between the truck frame clamp 62 of the first outrigger assembly 50 and truck frame clamp 62 of the second outrigger assembly 51, as shown in FIG. 8A, for example. In some embodiments, the cross member is formed of first and second sections, so as to be adjustable in length. In other embodiments, the cross member is a single component with a predetermined length. Further, in some embodiments, the truck structure includes a drive shaft protection collar 72 attached to the cross member 70, as shown in FIG. 9A, for example.

In some embodiments the first outrigger arrangement 50 is free of any welded connections to the truck frame 20 or the lateral support 26, and the second outrigger arrangement 51 is also free of any welded connections to the truck frame 20 or the lateral support 26.

Unless otherwise indicated herein, the terms "first," "second," etc. are used merely as labels. These identifiers are not intended to impose hierarchical, ordinal, or positional requirements on the items to which these terms refer. Moreover, reference to a "first" feature or item does not require the existence of a "second" or higher-numbered item.

Unless otherwise indicated herein, the term "or" is inclusive. For example, a description of a device as including a first component or a second component should be understood to include devices including the first component without the second component, devices including the second component without the first component, and devices including both the first component and the second component.

As used herein, the description of a system, apparatus, device, structure, article, element, component, or hardware as being "configured to" perform a specified function is indeed capable of performing the specified function without any alteration, rather than merely having potential to perform the specified function after further modification. In other words, the system, apparatus, structure, article, element, component, or hardware "configured to" perform the specified function is specifically selected, created, implemented, utilized, programmed, and/or designed for the purpose of performing the specified function. Further, as used herein, the term "configured to" denotes existing characteristics of the system, apparatus, structure, article, element, component, or hardware which enable the system, apparatus, structure, article, element, component, or hardware to perform the specified function without further modification.

While various aspects and embodiments have been disclosed herein, it will be apparent to those skilled in the art that various modifications and variations may be made to the devices and methods described here without departing from the scope of the disclosure. Accordingly, the present disclosure is intended to cover such modifications and variations of the disclosure, with the scope of the disclosure being set forth by the appended claims and their equivalents.

The invention claimed is:

1. A mechanically fastened outrigger arrangement for providing an automatic four bar linkage tailgate anchor point, the mechanically fastened outrigger arrangement comprising:
   an outrigger arrangement support frame;
   an outrigger extending outward from the outrigger arrangement support frame to a distal end configured to support a tailgate actuation link;
   outrigger braces extending from the outrigger arrangement support frame to the distal end of the outrigger;
   a lower clamp configured to secure the outrigger arrangement support frame to a lateral support of a truck; and
   a truck frame clamp configured to secure the outrigger arrangement support frame to a truck frame.

2. The mechanically fastened outrigger arrangement according to claim 1, wherein the outrigger arrangement support frame includes a plurality of support plates.

3. The mechanically fastened outrigger arrangement according to claim 2, wherein the plurality of support plates includes three support plates coupled to each other in a triangular configuration.

4. The mechanically fastened outrigger arrangement according to claim 2, wherein the lower clamp is formed by a base plate of the plurality of support plates.

5. The mechanically fastened outrigger arrangement according to claim 4, wherein the base plate includes a first component and a second component that is adjustable with respect to the first component so as to clamp around the lateral support.

6. The mechanically fastened outrigger arrangement according to claim 1, wherein the truck frame clamp includes a clamping plate spaced from the outrigger arrangement support frame.

7. The mechanically fastened outrigger arrangement according to claim 6, wherein a distance between the outrigger arrangement support frame and the clamping plate is adjustable so as to clamp onto the truck frame.

8. The mechanically fastened outrigger arrangement according to claim 6, wherein the clamping plate is coupled to a cross member configured to attach to a second outrigger arrangement.

9. The mechanically fastened outrigger arrangement according to claim 1, wherein each of the outrigger braces includes a first section attached to a second section, and
   wherein the length of each outrigger brace is based on the position of the attachment of the first section to the second section.

10. The mechanically fastened outrigger arrangement according to claim 1, wherein the outrigger is part of a beam that extends through the outrigger arrangement support frame to a second outrigger arrangement.

11. A truck structure with an automatic four bar linkage tailgate, the truck structure comprising:
   a truck frame;
   a lateral support extending across the truck frame;
   a first outrigger arrangement disposed on a first side of the truck frame, the first outrigger arrangement comprising:
      a first outrigger arrangement support frame,
      a first outrigger extending outward from the first outrigger arrangement support frame to a distal end configured to support a first tailgate actuation link of the automatic four bar linkage tailgate,
      a first group of outrigger braces extending from the first outrigger arrangement support frame to the distal end of the first outrigger;

a first lower clamp configured to secure the first outrigger arrangement support frame to the lateral support; and a first truck frame clamp configured to secure the first outrigger arrangement support frame to the truck frame; and a second outrigger arrangement disposed on a second side of the truck frame, the second outrigger arrangement comprising:

a second outrigger arrangement support frame, a second outrigger extending outward from the second outrigger arrangement support frame to a distal end configured to support a second tailgate actuation link of the automatic four bar linkage tailgate, a second group of outrigger braces extending from the second outrigger arrangement support frame to the distal end of the second outrigger;

a second lower clamp configured to secure the second outrigger arrangement support frame to the lateral support; and a second truck frame clamp configured to secure the second outrigger arrangement support frame to the truck frame.

12. The truck structure according to claim 11, wherein the first outrigger and the second outrigger are both part of a beam that extends from the first outrigger arrangement to the second outrigger arrangement.

13. The truck structure according to claim 11, wherein the beam extends through the first outrigger arrangement support frame and the second outrigger arrangement support frame.

14. The truck structure according to claim 11, wherein the lateral support is a hoist mount configured to support a hoist for raising a truck body.

15. The truck structure according to claim 11, further comprising a cross member extending between the first truck frame clamp and second truck frame clamp.

16. The truck structure according to claim 15, wherein the cross member is coupled to an off-highway truck drive shaft protection collar.

17. The truck structure according to claim 11, wherein the first outrigger arrangement is free of any welded connections to the truck frame or the lateral support, and wherein the second outrigger arrangement is free of any welded connections to the truck frame or the lateral support.

18. A mechanically fastened outrigger arrangement for providing an automatic four bar linkage tailgate anchor point, the mechanically fastened outrigger arrangement comprising:

outrigger arrangement support plates;

an outrigger extending from the outrigger arrangement support plates;

outrigger braces extending from the outrigger arrangement support plates to a distal end of the outrigger;

an outrigger hoist clamp plate; and an outrigger truck frame clamp plate configured to secure a truck frame element between the outrigger truck frame clamp plate and the outrigger arrangement support plates.

19. The mechanically fastened outrigger arrangement according to claim 18, wherein the outrigger hoist clamp plate includes an upper component and a lower component configured to cooperate so as to clamp around a hoist mount of an off-highway truck.

20. The mechanically fastened outrigger arrangement according to claim 18, wherein the outrigger hoist clamp plate forms one of the outrigger arrangement support plates.

* * * * *